(12) United States Patent
Park et al.

(10) Patent No.: US 9,537,178 B2
(45) Date of Patent: Jan. 3, 2017

(54) ELECTRODE ASSEMBLY AND LITHIUM SECONDARY BATTERY INCLUDING THE SAME

(71) Applicant: LG Chem, Ltd.

(72) Inventors: Sung Joon Park, Seoul (KR); Seung Don Choi, Daejeon (KR); Yong Kyu Ju, Daejeon (KR); Ji Hoon Jeon, Daejeon (KR); Hye Jin Kang, Daejeon (KR)

(73) Assignee: LG Chem, Ltd. (KR)

( * ) Notice: Subject to any disclaimer, the term of this patent is extended or adjusted under 35 U.S.C. 154(b) by 391 days.

(21) Appl. No.: 13/739,481

(22) Filed: Jan. 11, 2013

(65) Prior Publication Data

US 2013/0130083 A1 May 23, 2013

Related U.S. Application Data

(63) Continuation of application No. PCT/KR2012/004542, filed on Jun. 8, 2012.

(30) Foreign Application Priority Data

Jun. 9, 2011 (KR) .................. 10-2011-0055667

(51) Int. Cl.
*H01M 10/0587* (2010.01)
*H01M 10/052* (2010.01)
(Continued)

(52) U.S. Cl.
CPC ......... *H01M 10/0587* (2013.01); *H01M 2/168* (2013.01); *H01M 10/0431* (2013.01); *H01M 10/058* (2013.01); *H01M 2/1653* (2013.01)

(58) Field of Classification Search
USPC .......................................... 429/94
See application file for complete search history.

(56) References Cited

U.S. PATENT DOCUMENTS 7,014,948 B2    3/2006 Lee et al.
2003/0104273 A1*  6/2003 Lee et al. .............. 429/144
(Continued)

FOREIGN PATENT DOCUMENTS

JP    H10-154500 A    6/1998
JP    H10-255767 A    9/1998
(Continued)

OTHER PUBLICATIONS

Supplemental Search Report from corresponding European Appln. No. 12766372.2, dated Jun. 22, 2015.

*Primary Examiner* — Daniel Gatewood
(74) *Attorney, Agent, or Firm* — Lerner, David, Littenberg, Krumholz & Mentlik, LLP

(57) ABSTRACT

Provided is an electrode assembly, and more particularly, an electrode assembly having a structure wound in a state, in which a plurality of unit cells having a stacking structure is disposed on a long sheet type separation film, and including the unit cells having two or more types of configurations of electrode materials, wherein a separator stacked on the unit cell having a stacking structure has a coating material coated on both sides thereof and the long sheet type separation film has a coating material coated on one side thereof. According to the present invention, an electrode assembly improving processability of preparation of a battery while reducing initial resistance during the preparation of the battery as well as having battery lifetime equivalent to that of a conventional battery and a lithium secondary battery including the electrode assembly may be provided.

4 Claims, 1 Drawing Sheet

(51) Int. Cl.
*H01M 10/04* (2006.01)
*H01M 10/058* (2010.01)
*H01M 2/16* (2006.01)

(56) References Cited

U.S. PATENT DOCUMENTS

| | | | |
|---|---|---|---|
| 2005/0266150 A1* | 12/2005 | Yong | H01M 2/166 427/58 |
| 2009/0111025 A1* | 4/2009 | Lee | H01M 2/166 429/251 |
| 2010/0261047 A1 | 10/2010 | Kim et al. | |
| 2010/0285341 A1 | 11/2010 | Yun et al. | |
| 2011/0217586 A1 | 9/2011 | Kim et al. | |

FOREIGN PATENT DOCUMENTS

| | | | | |
|---|---|---|---|---|
| JP | 2004-519824 A | | 7/2004 | |
| JP | 2009-505366 A | | 2/2009 | |
| JP | 2010-525542 A | | 7/2010 | |
| KR | 2002-0071204 A | | 9/2002 | |
| KR | 20080036250 | * | 4/2008 | |
| KR | 20080036250 A | | 4/2008 | |
| KR | 20080095967 A | | 10/2008 | |
| KR | 20090037552 A | | 4/2009 | |
| KR | 20090079501 A | | 7/2009 | |
| KR | 101035284 B1 | | 5/2011 | |
| WO | 2004/097971 A1 | | 11/2004 | |
| WO | WO 2006062349 A1 | * | 6/2006 | H01M 2/1653 |
| WO | 2009/078632 A2 | | 6/2009 | |

* cited by examiner

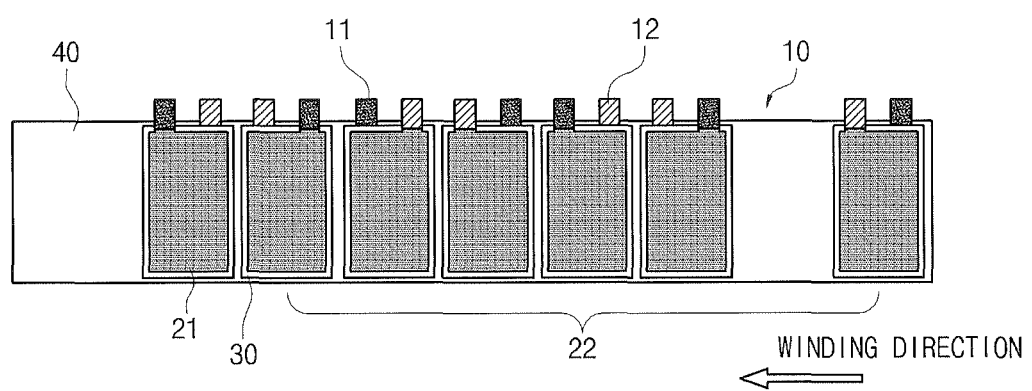

ELECTRODE ASSEMBLY AND LITHIUM SECONDARY BATTERY INCLUDING THE SAME

CROSS-REFERENCE TO RELATED APPLICATIONS

This application is a continuation of International Application No. PCT/KR2012/004542 filed on Jun. 8, 2012, which claims priority from Korean Patent Application No. 10-2011-0055667 filed with Korean Intellectual Property Office on Jun. 9, 2011, the entire contents of which are incorporated herein by reference.

TECHNICAL FIELD

This application claims priority of Korean Patent Application No. 10-2011-0055667, filed with Korean Intellectual Property Office on Jun. 9, 2011, the entire contents of which are hereby incorporated by reference.

The present invention disclosed herein relates to an electrode assembly and a lithium secondary battery including the same, and more particularly, to an electrode assembly improving processability of preparation of a battery while reducing initial resistance during the preparation of the battery as well as having battery lifetime equivalent to that of a conventional battery, and a lithium secondary battery including the electrode assembly.

BACKGROUND OF THE INVENTION

In line with increasing technological development and demand relating to mobile devices, demand for secondary batteries has also been rapidly increased. Among the secondary batteries, lithium secondary batteries having high energy density and operating voltage and excellent preservation and lifetime characteristics have been widely used as energy sources of various electronic products as well as various mobile devices.

A lithium secondary battery uses metal oxide such as $LiCoO_2$ as a positive electrode active material and a carbon material as a negative electrode active material, a porous polymer separator is disposed between a negative electrode and a positive electrode, and a non-aqueous electrolyte solution containing a lithium salt such as $LiPF_6$ functions as a medium in which lithium ions move between the negative electrode and the positive electrode. The lithium secondary battery must be basically stable in an operating voltage range of the battery, must have high charge and discharge efficiencies, and must have an ability to transfer ions at a sufficiently high rate.

A lithium secondary battery having an operating voltage of 3.6 V or more is used as a power source of a portable electronic device or a plurality of the lithium secondary batteries is connected in series to be used in a high-power hybrid vehicle. Since an operating voltage of the lithium secondary battery is three times higher than that of a nickel-cadmium battery or nickel-metal hydride battery and energy density characteristics per unit weight are also excellent, the lithium secondary battery has a tendency to be used widely. In the lithium secondary battery, coating of a polymer separator may be performed in order to increase adhesion to an electrode while maintaining safety of a cell, high-temperature storage performance, and high-temperature cycle performance. However, this may cause an increase in initial resistance of the battery.

SUMMARY OF THE INVENTION

The present invention provides an electrode assembly improving processability of preparation of a battery while reducing initial resistance during the preparation of the battery as well as having battery lifetime equivalent to that of a conventional battery and a lithium secondary battery including the electrode assembly.

Embodiments of the present invention provide electrode assemblies having a structure wound in a state in which a plurality of unit cells having a stacking structure is disposed on a long sheet type separation film, including the unit cells having two or more types of configurations of electrode materials, wherein a separator stacked on the unit cell having a stacking structure has a coating material coated on both sides thereof and the long sheet type separation film has a coating material coated on one side thereof.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 illustrates an electrode assembly of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention relates to an electrode assembly 10 having a structure wound in a state in which a plurality of unit cells having a stacking structure is disposed on a long sheet type separation film 40, including the unit cells having two or more types of configurations of electrode materials, wherein a separator 30 stacked on the unit cell having a stacking structure has a coating material coated on both sides thereof and the long sheet type separation film 40 has a coating material coated on one side (specifically, a side having the plurality of unit cells disposed thereon) thereof, and a lithium secondary battery including the electrode assembly 10.

Hereinafter, the present invention will be described in more detail.

The present invention relates to an electrode assembly 10 having a structure wound in a state, in which positive electrodes and negative electrodes, a plurality of unit electrodes having sizes respectively corresponding to a size of a cell, are alternatingly stacked and a plurality of unit cells having a stacking structure is disposed on a long sheet type separation film 40, and a lithium secondary battery including the electrode assembly 10.

Each unit cell in the electrode assembly 10 of the present invention is coated by using a separator 30 having both sides coated thereon. The reason for this is that adhesion of electrode to the separator 30 may be facilitated and performance may be maintained as it is while safety is maintained.

A thickness of the coating material for coating both sides may be in a range of about 0.001 μm to about 100 μm. When the coating thickness is within the foregoing range, an increase in thickness of the battery may be prevented and a decrease in battery performance may be minimized.

The electrode assembly 10 of the present invention has a stack/folding type structure, in which a bi-cell and/or a full cell (e.g., bi-cell) are formed of a small number of unit cells in a stacking method and disposed in plural on the long sheet type separation film 40, and then sequentially wound to be overall formed as a plate-type structure.

The bi-cell is a unit cell having the same electrode disposed at both sides of the cell, such as a unit structure of positive electrode/separator/negative electrode/separator/positive electrode and a unit structure of negative electrode/separator/positive electrode/separator/negative electrode. In order to form an electrochemical cell including a secondary battery by using the foregoing bi-cell, a plurality of bi-cells must be stacked so as to allow a bi-cell having the structure of positive electrode/separator/negative electrode/separator/positive electrode and a bi-cell having the structure of negative electrode/separator/positive electrode/separator/negative electrode to be faced each other in a state of having the separation film 40 disposed therebetween. Also, a positive electrode terminal 11 and a negative electrode terminal 12 protrude outside the each unit cell.

In the electrode assembly 10 of the present invention, the configuration of the electrode material may be determined according to type and thickness of the electrode material coated on a current collector. The specific configuration of the electrode material is not limited to a typical configuration of the electrode assembly 10.

For example, in the case that an electrode material having a different configuration is a positive electrode material in a preferred example, the electrode assembly 10 formed of first unit cells 21 and second unit cells 22 may be configured in order to prepare the electrode assembly 10 of the present invention.

In general, capacity, lifetime characteristics, and high-rate charge and discharge characteristics of a secondary battery may depend on type and thickness of a positive electrode active material or negative electrode active material.

Therefore, in the case that the electrode material having a different configuration is a positive electrode material in a preferred example, the first unit cell 21 may include one or more selected from the group consisting of lithium cobalt oxide, lithium manganese oxide, and lithium nickel oxide, and the second unit cell 22 may include one or more selected from the group consisting of lithium manganese-cobalt oxide, lithium manganese-nickel oxide, lithium nickel-cobalt oxide, and lithium manganese-nickel-cobalt oxide.

Each unit cell in the electrode assembly 10 of the present invention is coated by using the separator 30 having both sides coated thereon. The reason for this is that adhesion of electrode to the separator 30 may be facilitated and performance may be maintained as it is while safety is maintained. A thickness of the coating material for coating both sides may be in a range of about 0.001 μm to about 100 μm. When the coating thickness is within the foregoing range, a decrease in battery performance may be minimized while an increase in thickness of the battery may be prevented.

The coating material for coating both sides may be one or more selected from the group consisting of lead zirconate titanate (PZT; $Pb(Zr,Ti)O_3$), lead lanthanum zirconate titanate (PLZT; $Pb_{1-x}La_xZr_{1-y}Ti_yO_3$), $Pb(Mg_{3}Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

A bi-cell may be used as the unit cell having a stacking structure. The reason for this is that a great advantage for the unit cell having higher capacity is that the bi-cell may be used while maintaining its battery shape and physical dimensional errors during the preparation process of the battery may also be decreased.

The electrode assembly 10 of the present invention is wound in a state, in which a plurality of unit cells having a stacking structure is disposed on a long sheet type separation film 40, and at this time, a length of the long sheet type separation film 40 is not limited to a length usable during winding of the cells.

The separation film 40 coated on one side is used as the long sheet type separation film during folding of the electrode assembly 10 of the present invention. The sheet type separation film 40 having a coating material coated on the one side thereof is used and thus, cost reduction may be obtained. Further, since a content of the coating material, an insulator, may be decreased as much as possible, conductivity and electrical properties of the battery may be further improved, and the plurality of electrode assemblies 10 may be included and thus, capacity may be maximized and a decrease in output due to the separator 40 of the battery may be prevented. A thickness of the coating material for coating one side may be in a range of about 0.001 μm to about 100 μm. When the coating thickness is within the foregoing range, battery performance may be maintained as it is while an increase in thickness of the battery may be prevented.

Specifically, the coating material for coating one side may be one or more selected from the group consisting of lead zirconate titanate (PZT), lead lanthanum zirconate titanate (PLZT), $Pb(Mg_{3}Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

In the long sheet type separation film 40, the one side coated with a coating material is to be the side having the plurality of unit cells disposed thereon. The reason for this is that adhesion of electrode to the separator may be facilitated and performance may be maintained as it is while safety may be maintained.

The electrode assembly 10 of the present invention may be used for a lithium secondary battery, and when two or more of the lithium secondary batteries are electrically connected and included, they may be used for a battery module or battery pack for a power source of a medium and large sized device. Specifically, examples of the medium and large sized device may be a power tool, an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

In the present invention, the electrode assembly 10 and the lithium secondary battery formed of the electrode assembly 10 may be prepared according to a typical method known in the art.

Hereinafter, the present invention will be described in detail according to specific examples, but the following examples are merely presented to exemplify the present invention. It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Example 1

Preparation of Positive Electrode

A slurry was prepared by dispersing lithium cobalt oxide, carbon black, and polyvinylidene fluoride (PVDF) in N-methyl-2-pyrrolidone (NMP) and then both sides of an aluminum foil were coated with the slurry. The coated aluminum foil was sufficiently dried and a positive electrode was then prepared by pressing the coated aluminum foil.
(Preparation of Negative Electrode)

A slurry was prepared by dispersing graphite, acetylene black, and PVDF in NMP and then both sides of a copper foil were coated with the slurry. The coated copper foil was sufficiently dried and a negative electrode was then prepared by pressing the coated copper foil.
(Separator & Separation Film)

Both sides of a separator were coated with PZT at a thickness of about 30 μm to prepare a bi-cell and thereafter, an electrode assembly was prepared by using a separation film coated on one side (use PLZT) at a thickness of about 30 μm during winding of 13 bi-cells.

Experimental Example

1) Initial Resistance: Initial resistance was calculated through a voltage drop when a half charged battery (SOC50) was discharged at a constant current (50 A), and resistance was decreased about 3% in comparison to that of a cell prepared by using a typical method.

2) Battery Lifetime: When lifetime of a battery was defined as a time in which resistance was increased 30% during storage at a constant high temperature, the battery had lifetime equivalent to that of a cell prepared by using a typical method.

As described above, it may be confirmed that the electrode assembly of the present invention improved processability of the preparation of the battery while reducing initial resistance as well as having excellent battery lifetime.

According to the present invention, an electrode assembly improving processability of preparation of a battery while reducing initial resistance during the preparation of the battery as well as having battery lifetime equivalent to that of a conventional battery and a lithium secondary battery including the electrode assembly may be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electrode assembly, comprising:
    a long sheet type separation film having a coating material coated on a first side thereof; and
    a plurality of unit cells disposed on the first side of the separation film,
    wherein the plurality of unit cells includes at least two types of unit cells, each type of unit cell having a different configuration of electrode materials,
    wherein each unit cell of the plurality of unit cells includes a separator, wherein the separator has a coating material coated on both sides thereof,
    wherein the coating material of the long sheet type separation film consists of lead lanthanum zirconate titanate (PLZT),
    wherein the coating material of the separator consists of lead zirconate titanate (PZT),
    wherein thicknesses of the coating materials coated on the separator and the long sheet type separation film are in a range of 30 μm to 100 μm,
    wherein the plurality of unit cells is present in a stacking structure caused by winding the separation film having the plurality of unit cells disposed on the first side thereon,
    wherein the plurality of unit cells is a plurality of bi-cells, and
    wherein the plurality of bi-cells is stacked such that a bi-cell having a structure of positive electrode/separator/negative electrode/separator/positive electrode and a bi-cell having a structure of negative electrode/separator/positive electrode/separator/negative electrode face each other and have the separator film disposed therebetween.

2. A lithium secondary battery comprising the electrode assembly of claim 1.

3. A battery module or battery pack for a power source of a medium and large sized device, battery module or battery pack comprising at least two electrically-connected lithium secondary batteries as claimed in claim 2.

4. The battery module or battery pack of claim 3, wherein the medium and large sized device is a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; an electric commercial vehicle; or a power storage system.

* * * * *